US011704481B1

(12) United States Patent
Dangoor et al.

(10) Patent No.: US 11,704,481 B1
(45) Date of Patent: Jul. 18, 2023

(54) K-ANONYMITY GUARANTEE IN TEXT ANONYMIZATION USING WORD EMBEDDINGS

(71) Applicant: INTUIT INC., Mountain View, CA (US)

(72) Inventors: Sheer Dangoor, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/069,831

(22) Filed: Dec. 21, 2022

(51) Int. Cl.
*G06F 40/279* (2020.01)
*G06F 40/166* (2020.01)
*G06F 21/62* (2013.01)

(52) U.S. Cl.
CPC ........ *G06F 40/166* (2020.01); *G06F 21/6254* (2013.01); *G06F 40/279* (2020.01)

(58) Field of Classification Search
CPC ... G06F 40/166; G06F 21/6254; G06F 40/279

USPC ............................................................ 704/9
See application file for complete search history.

(56) References Cited

U.S. PATENT DOCUMENTS

2021/0200901 A1* 7/2021 Vemula ............... G06F 18/2323

\* cited by examiner

*Primary Examiner* — Thierry L Pham
(74) *Attorney, Agent, or Firm* — DLA Piper LLP (US)

(57) ABSTRACT

Systems and methods for k-anonymizing a corpus of documents using linguistic similarities and embeddings distances between words. For instance, a word pair is selected based on linguistic similarity (e.g., belonging to the same part of speech) and small embeddings distance. For the selected word pair, a plurality of words is retrieved, also based on linguistic similarity to, and embeddings distances from, the selected word pair. Out of the plurality of words, a third word is identified that has a closer linguistic similarity to the word pair and also has smaller embeddings distances from the word pair. Each word in the word pair is then replaced by the third word. The process is repeated until k-anonymity is achieved.

20 Claims, 4 Drawing Sheets

200

|  | Word$_1$ | Word$_2$ | Word$_3$ | ........................ |  | Word$_m$ |  |
|---|---|---|---|---|---|---|---|
|  |  |  |  | ... | ... | ... |  |
| Document$_1$ | 0 | 1 | 0 | ... | ... | ... | 1 |
|  |  |  |  | ... | ... | ... | ... |
| Document$_2$ | 1 | 0 | 0 | ... | ... | ... | ... |
|  |  |  |  | ... | ... | ... | ... |
| Document$_3$ | 1 | 0 | 0 | ... | ... | ... | ... |
|  |  |  |  | ... | ... | ... | ... |
|  |  |  |  | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
|  | ... | ... | ... | ... | ... |  |  |
|  | ... | ... | ... | ... | ... | ... | ... |
| Docuemnt$_n$ | ... | ... | ... | ... | ... | ... | ... |

300

FIG. 3

K-ANONYMITY GUARANTEE IN TEXT ANONYMIZATION USING WORD EMBEDDINGS

BACKGROUND

Collection and storage of data is ubiquitous in this information age. Personal data is constantly being collected: electronic commerce companies collect shopping data, social networks collect social behavior data, and credit reporting companies collect debt and payment data, just to name a few. The collected data is used for marketing, service delivery, advertisement, research—generally, to enhance the exchanges between consumers and producers in the marketplace.

A vast collection of personal data, however, raises privacy concerns. In addition to the ethical obligation of keeping personal data confidential, laws of several jurisdictions expressly mandate such confidentiality. Furthermore, the data collections become obvious targets for nefarious actors. It is common news these days that databases of even reputed companies and government entities have been hacked into, causing massive data breaches and publication of personal information. To ensure privacy and to decrease the likelihood of publication of nefariously obtained personal information, a database may be anonymized. Anonymization means that even when some aspects of the database is visible, personal information cannot be gleaned from the visible information.

One example of anonymization is k-anonymity. A dataset has k-anonymity if the information for each person contained in the dataset cannot be distinguished from at least k-1 persons whose information also appears in the dataset. In other words, searching for a certain attribute (e.g., age) in the dataset may return records of k persons who cannot be distinguished from one another. Therefore, even if an attribute may be known, it will be difficult to pinpoint a specific person possessing that attribute.

But conventional approaches to generating k-anonymity have several technical shortcomings. For example, current anonymization methods attempt to find personally identifiable information (PII) using simple rules (usually Regex-s) and or use machine learning models that resemble named entity recognition. Because a training dataset containing personal data is scarce and because the personal data tends to be very diverse, these methods often produce inaccurate results. Furthermore, the conventional approaches, which generally require a clean labeling or structure, do not cope well with personal data that can be inferred from lengthy sentences, e.g., the personal data may be within a transcript of a phone conversation. Therefore, conventional models cannot guaranty any formal notion of anonymization, which is undesirable.

As such, a significant improvement in data anonymization using k-anonymity is therefore desired.

SUMMARY

Embodiments disclosed herein solve the aforementioned technical problems and may provide other technical solutions as well. One or more embodiments provide systems and methods for k-anonymizing a corpus of documents using linguistic similarities and embeddings distances between words. For instance, a word pair is selected based on linguistic similarity (e.g., belonging to the same part of speech) and a smaller embeddings distance. For the selected word pair, a plurality of words is retrieved, also based on linguistic similarity to and the embeddings distances from the selected word pair. Out of the plurality of words, a third word is identified that has a closer linguistic similarity to the word pair and also has smaller embeddings distances from the word pair. Each word in the word pair is then replaced by the third word. The process is repeated until k-anonymity is achieved.

In one embodiment, a method performed by a processor is provided. The method may comprise identifying a first word and a second word in a structured corpus of documents, the first word and the second word sharing at least one linguistic attribute and having an embeddings distance below a first threshold. The method may also comprise retrieving a plurality of words sharing the at least one linguistic attribute with the first word and the second word and that have corresponding embeddings distances from the first word and the second word below a second threshold. The method may further comprise selecting a third word from the plurality of words; and replacing each of the first word and the second word with the third word in text corresponding to the structured corpus of documents.

In another embodiment, a system is provided. The system may comprise a non-transitory storage medium storing computer program instructions and one or more processors configured to execute the computer program instructions to cause operations. The operations may comprise identifying a first word and a second word in a structured corpus of documents, the first word and the second word sharing at least one linguistic attribute and having an embeddings distance below a first threshold. The operations may also comprise selecting a third word from the plurality of words; and replacing each of the first word and the second word with the third word in text corresponding to the structured corpus of documents.

BRIEF DESCRIPTION OF THE DRAWINGS

FIG. 3 shows an example structured tabular format based on the principle disclosed herein.

DETAILED DESCRIPTION OF SEVERAL EMBODIMENTS

Anonymization is desired to prevent a hacker or other actor from revealing personally identifiable information from a corpus of documents. One example of anonymization is k-anonymization. Conventional k-anonymization techniques, however, have several technical shortcomings. For example, the conventional techniques follow simple rules, are often inaccurate, and cannot handle conversational data (e.g., transcripts of phone calls). One or more embodiments disclosed herein solve these and other technical problems by performing k-anonymization based on linguistic similarity and embeddings distances between words in a corpus of documents. A word pair is first identified based on the linguistic similarity (e.g., belonging to the same part of speech) and an embeddings distance between them. Then, a plurality of words with linguistic similarity to, and having smaller embeddings distances from, the word pair is retrieved. Out of the plurality of words, a third word closer to the word pair in terms of both linguistic similarity and embeddings distances is selected. Each word in the word pair is then replaced by the third word. The process is repeated until the corpus of documents achieves k-anonymity.

Figure 1:
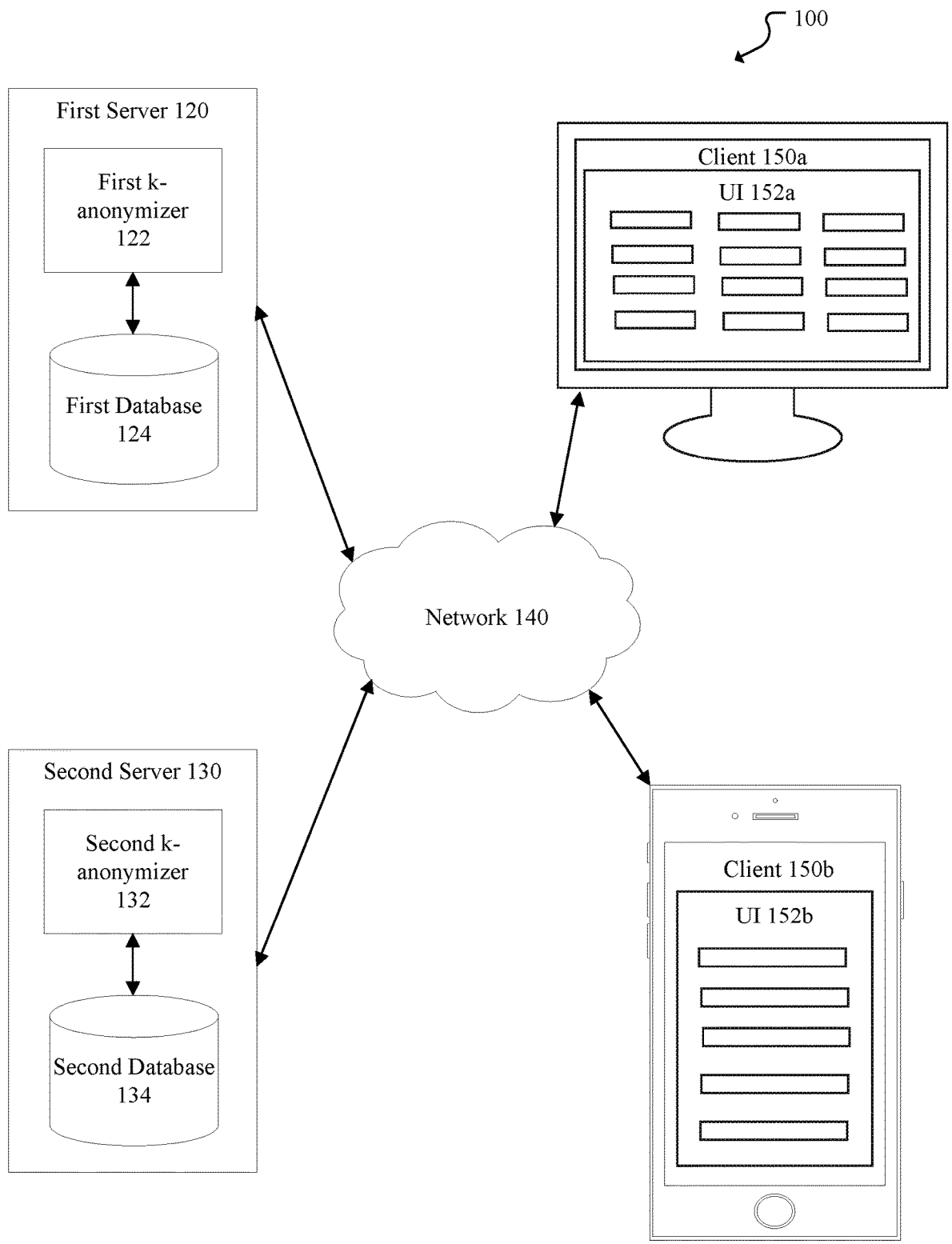
FIG. 1 shows an example of a system configured for k-anonymizing a corpus of documents based on the principles disclosed herein.

FIG. 1 shows an example of a system 100 configured for k-anonymizing a corpus of documents based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150") and servers 120, 130 interconnected through a network 140. The first server 120 hosts a first k-anonymizer 122 and a first database 124 and the second server 130 hosts a second k-anonymizer 132 and a second database 134. The client devices 150a, 150b have user interfaces 152a, 152b, respectively, (collectively referred to herein as "user interfaces (UIs) 152") which may be used to communicate with the k-anonymizers 122, 132 using the network 140. For example, communication between the different components of the system 100 is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present the user interfaces (UIs) 152 and receive user inputs. The client devices 150 may generally be used by administrative and specialized users to access the first k-anonymizer 122 and or the second k-anonymizer 132. In one or more embodiments, the users interact with the k-anonymizers 122, 132 to k-anonymize a corpus of documents. The interactions may include, for example, identifying the corpus of documents to be k-anonymized, providing commands for the k-anonymizers 122, 132 to perform the corresponding operations, and configuring one or more parameters (e.g., embeddings distance thresholds) of the k-anonymizers 122, 132.

Each of the k-anonymizers 122, 132 perform the different operations described throughout this disclosure. For instance, each k-anonymizer receives a corpus of documents (e.g., from corresponding databases 124, 134) and performs k-anonymization on the corpus of documents. The k-anonymization operations include identifying a pair of words having a similar linguistic attribute (e.g., being of the same part of speech) and with a relatively smaller embeddings distance. Then, a third word is identified that is linguistically similar to and or has a relatively smaller embeddings distance to each of the pair of words. For anonymization, each of the pair of words is replaced with the third word. This process is repeated until the corpus of documents is k-anonymized. The k-anonymized corpus of documents is then saved to the corresponding databases 124, 134.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

Figure 2:
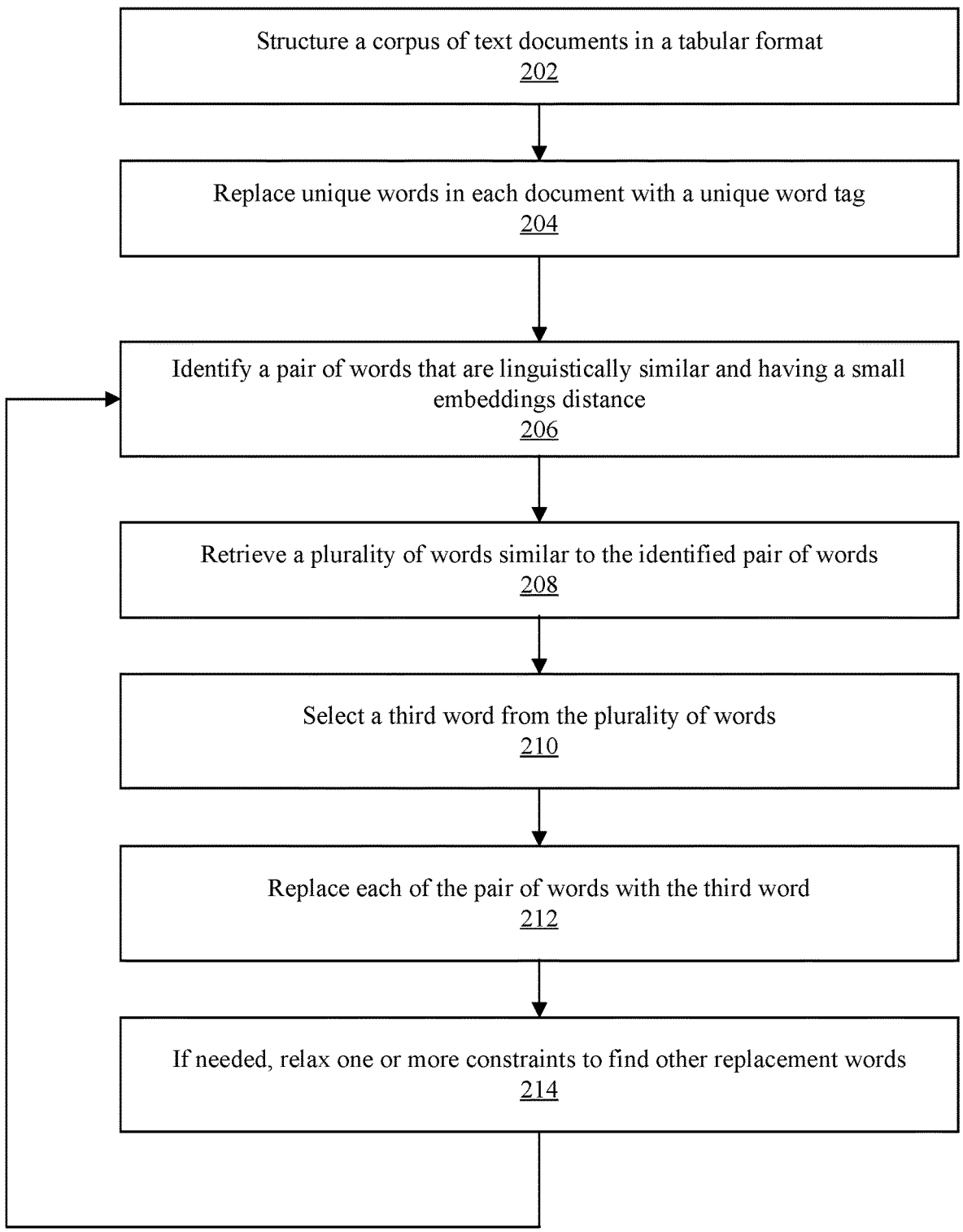
FIG. 2 shows an example method of k-anonymizing a corpus of documents based on the principles disclosed herein.

FIG. 2 shows an example method 200 of k-anonymizing a corpus of documents based on the principles disclosed herein. One or more steps of the method 200 may be performed by one or more components of the system 100 shown in FIG. 1. It should be understood that the shown steps are merely exemplary and should not be considered limiting. Furthermore, the sequence of the steps is exemplary, and the illustrated sequence should not be considered limiting. Therefore, methods with additional, alternative, fewer, or differently sequenced steps should also be considered within the scope of this disclosure.

The method 200 starts at step 202, where a corpus of text documents is structured in a tabular format. In one or more embodiments, the text documents may include transcripts of phone calls made to a customer service center, which are generally in an un-tabulated, unstructured form. That is, each document may be a plaintext transcription of a corresponding phone call and may comprise personal information about the caller. For example, the personal information may include the caller's full legal name, age, address, income, and or any other type of personal information. The personal information may also include other information used to authenticate the user, e.g., a pin code, mother's maiden name, etc. The tabular format generated from the text documents may include, for example, a table where each word has a respective column, and each document has a respective row.

FIG. 3 shows an example structured tabular format 300 (e.g., a table) based on the principle disclosed herein. As shown, there are n documents and therefore n rows, i.e., $Document_1$ to $Document_n$, and m words forming m columns, i.e., $Word_1$ to $Word_n$. The intersection of the each of the rows and columns shows whether a particular word is in a particular document. For example, the illustrated structured tabular format 300 indicates that $Word_2$ is within $Document_1$ but $Word_3$ is not within $Document_1$. It should, however, be understood that the illustrated structured format is just an example and should not be considered limiting. Any kind of structured format should be considered within the scope of this disclosure. Furthermore, the use of the words in the columns is also for illustration purposes and that any portion of test (e.g., phrases, sentences) may be used to determine whether the corresponding portions exist in one or more of the documents.

Returning back to FIG. 2, at step 204, unique words in each document are replaced with a unique word tag (e.g., <UNIQUE_WORD>). A unique word may include technical terms, names of unique fillable forms, country/state identifier, etc. that may not be replaced by synonymous and or generic terms. Tagging the unique words generally makes the computation simpler because the method 200 may not necessarily attempt to find similar words for the tagged unique words.

In one or more embodiments, steps 206-214 are performed repeatedly until k-anonymity is achieved for the corpus of documents. At step 206, a pair of words that are linguistically similar and have a small embeddings distance are identified. In one or more embodiments, the linguistic similarity may be based on a part of speech. For example, both words in the pair can be a verb or a noun. The smaller embeddings distance indicates that the selected pair of words are similar in meaning. The embeddings distance may be based on any kind of word embeddings technique, where each word is converted to a vector to mathematically represent the corresponding words. Using these vectors, the embeddings distance may be measured using Euclidean distance, cosine similarity, and or any other type of distance calculation. The determination of the smaller embeddings distance may be based on a threshold, that is, only the pair of words with the corresponding embeddings distance below the threshold are identified.

At step 208, a plurality of words similar to the identified pair of words are retrieved. The plurality of words may be linguistically similar to the pair of words, e.g., the plurality of words may belong to the same part of speech as the pair of words. The plurality of words may also have embeddings distances from the pair of words that are below the threshold. The plurality of words that are linguistically similar and close in terms of embeddings distances forms a candidate pool for a word that may be used to replace the pair of words.

At step 210, a third word is selected from the plurality of words. As described above, the selected word is both linguistically similar and has close embeddings distances to the identified pair of words. In one or more embodiments, the third word is selected such that it has an embeddings distance from the first word of the pair of words that is below a threshold and another embeddings distance from the second word of the pair of words that is below another threshold. In other embodiments, the third word is selected such that it has embeddings distance from each of the first and second words that is below a same threshold. These are just some examples of using threshold distances, and any kind of thresholds should be considered within the scope of this disclosure.

In a non-limiting example, if the pair of words includes "one" and "three," the word "five" may be chosen because it has small embeddings distances to both "one" and "three" and also belongs to the same part of speech. As another example, for the pair of words "Mike" and "Roger," a word "Joe" may be selected because it has smaller embeddings distances to both "Mike" and "Roger" and also shares the same part of speech (i.e., proper noun). These are just but a few examples of selecting the third word, and any kind of selection should be considered within the scope of this disclosure.

At step 212, each of the pair of words is replaced with the selected third word. As discussed above, for example, each of "one" and "three" may be replaced by "five"; and each of "Mike" and "Roger" may be replaced by "Joe." The replacement causes the text to be progressively anonymized, as different words with specific information will be replaced with common words—thereby losing specificity information while gaining in anonymity.

At step 214, one or more constraints to find other replacement words may be relaxed, if needed. For example, the threshold for the embeddings distances may be increased, i.e., words with higher embeddings distances may be considered. As another example, the linguistic similarity based on parts of speech may be relaxed as well—adverbs and adjectives can be considered as linguistically similar. In one or more embodiments, the constraints may be relaxed based on the what the user desires within the trade-off spectrum between accuracy (or specificity) and anonymity.

As described above, steps 206-214 are repeated until k-anonymity is reached. Once the k-anonymity is reached, the execution of the method 200 is terminated. As used herein, the pair of words is just an example, and a pair of phrases, a pair of sentences, or a pair comprising any number of words can alternatively be identified and replaced with corresponding similar phrases, sentences, or word groups. Therefore, any kind of linguistic segmentation should be considered within the scope of this disclosure.

Figure 4:
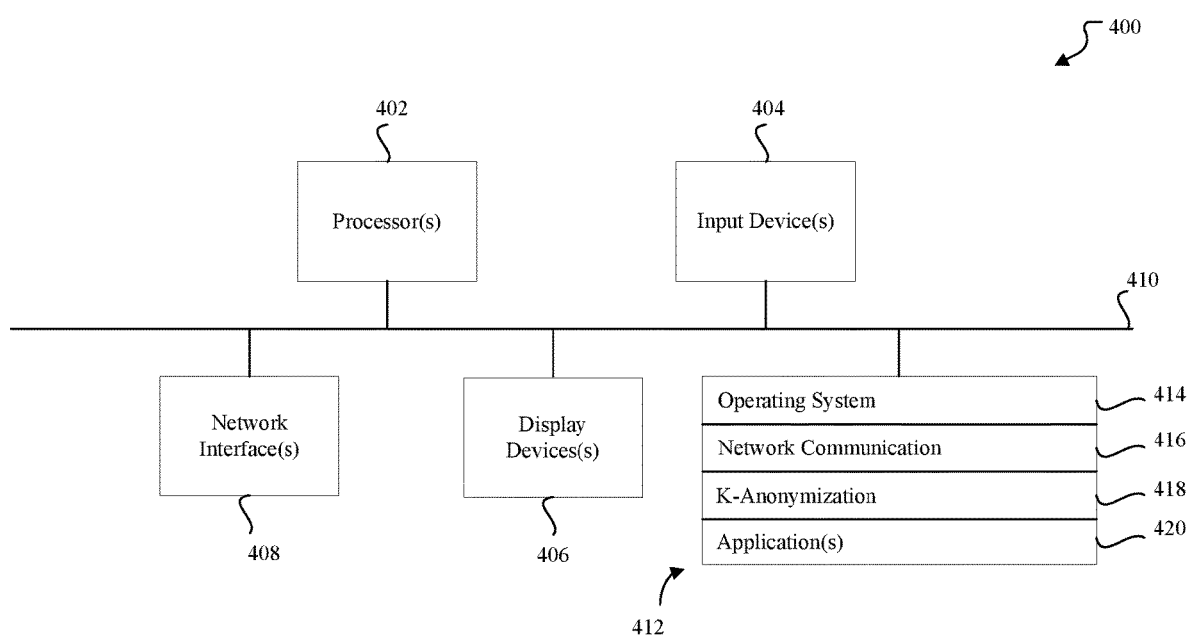
FIG. 4 shows a block diagram of an example computing device that implements various features and processes, based on the principles disclosed herein.

FIG. 4 shows a block diagram of an example computing device 400 that implements various features and processes, based on the principles disclosed herein. For example, computing device 400 may function as first server 120, second server 130, client 150*a*, client 150*b*, or a portion or combination thereof in some embodiments. The computing device 400 also performs one or more steps of the method 200. The computing device 400 is implemented on any electronic device that runs software applications derived from compiled instructions, including without limitation personal computers, servers, smart phones, media players, electronic tablets, game consoles, email devices, etc. In some implementations, the computing device 400 includes one or more processors 402, one or more input devices 404, one or more display devices 406, one or more network interfaces 408, and one or more computer-readable media 412. Each of these components is coupled by a bus 410.

Display device 406 includes any display technology, including but not limited to display devices using Liquid Crystal Display (LCD) or Light Emitting Diode (LED) technology. Processor(s) 402 uses any processor technology, including but not limited to graphics processors and multi-core processors. Input device 404 includes any known input device technology, including but not limited to a keyboard (including a virtual keyboard), mouse, track ball, and touch-sensitive pad or display. Bus 410 includes any internal or external bus technology, including but not limited to ISA, EISA, PCI, PCI Express, USB, Serial ATA or FireWire. Computer-readable medium 412 includes any non-transitory computer readable medium that provides instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 412 includes various instructions 414 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 404; sending output to display device 406; keeping track of files and directories on computer-readable medium 412; controlling peripheral devices (e.g., disk drives, printers, etc.) which can be controlled directly or through an I/O controller; and managing traffic on bus 410. Network communications instructions 416 establish and maintain network connections (e.g., software for implementing communication protocols, such as TCP/IP, HTTP, Ethernet, telephony, etc.).

K-anonymization instructions 418 include instructions that implement the disclosed processes for k-anonymization of a corpus of documents.

Application(s) 420 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings. Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, the method comprising:
    identifying a first word and a second word in a structured corpus of documents, the first word and the second word sharing at least one linguistic attribute and having an embeddings distance below a first threshold;
    retrieving a plurality of words sharing the at least one linguistic attribute with the first word and the second word and that have corresponding embeddings distances from the first word and the second word below a second threshold;
    selecting a third word from the plurality of words; and
    replacing each of the first word and the second word with the third word in text corresponding to the structured corpus of documents.

2. The method of claim 1, wherein identifying the first word and the second word sharing the at least one linguistic attribute comprises:
  identifying the first word and the second word as belonging to a same part of speech.

3. The method of claim 1, wherein retrieving the plurality of words sharing the at least one linguistic attribute with the first word and the second word comprises:
  retrieving the plurality of words belonging to a same part of speech as the first word and the second word.

4. The method of claim 1, wherein selecting the third word from the plurality of words comprises:
  selecting the third word that has an embeddings distance from the first word below a third threshold.

5. The method of claim 4, wherein selecting the third word from the plurality of words comprises:
  selecting the third word that has an embeddings distance from the second word below a fourth threshold.

6. The method of claim 1, wherein selecting the third word from the plurality of words comprises:
  selecting the third word that has embeddings distances from each of the first word and the second word below a third threshold.

7. The method of claim 6, further comprising:
  increasing the third threshold to a fourth threshold in response to determining that the third word has the embeddings distances from each of the first word and the second word above the third threshold.

8. The method of claim 1, further comprising:
  repeating the identifying through replacing steps until a k-anonymization is achieved for the structured corpus of documents.

9. The method of claim 1, further comprising:
  calculating the embeddings distances using at least one of Euclidean distance or cosine similarity.

10. The method of claim 1, further comprising:
  replacing at least one unique word in the structured corpus of documents with a unique word tag.

11. A system comprising:
  a non-transitory storage medium storing computer program instructions; and
  one or more processors configured to execute the computer program instructions to cause operations comprising:
  identifying a first word and a second word in a structured corpus of documents, the first word and the second word sharing at least one linguistic attribute and having an embeddings distance below a first threshold;
  retrieving a plurality of words sharing the at least one linguistic attribute with the first word and the second word and that have corresponding embeddings distances from the first word and the second word below a second threshold;
  selecting a third word from the plurality of words; and
  replacing each of the first word and the second word with the third word in text corresponding to the structured corpus of documents.

12. The system of claim 11, wherein identifying the first word and the second word sharing at least one linguistic attribute comprises:
  identifying the first word and the second word as belonging to a same part of speech.

13. The system of claim 11, wherein retrieving the plurality of words sharing the at least one linguistic attribute with the first word and the second word comprises:
  retrieving the plurality of words belonging to a same part of speech as the first word and the second word.

14. The system of claim 11, wherein selecting the third word from the plurality of words comprises:
  selecting the third word that has an embeddings distance from the first word below a third threshold.

15. The system of claim 14, wherein selecting the third word from the plurality of words comprises:
  selecting the third word that has an embeddings distance from the second word below a fourth threshold.

16. The system of claim 14, wherein selecting the third word from the plurality of words comprises:
  selecting the third word that has embeddings distances from each of the first word and the second word below a third threshold.

17. The system of claim 16, the operations further comprising:
  increasing the third threshold to a fourth threshold in response to determining that the third word has the embeddings distances from each of the first word and the second word above the third threshold.

18. The system of claim 11, the operations further comprising:
  repeating the identifying through replacing operations until a k-anonymization is achieved for the structured corpus of documents.

19. The system of claim 11, the operations further comprising:
  calculating the embeddings distances using at least one of Euclidean distance or cosine similarity.

20. The system of claim 11, the operations comprising:
  replacing at least one unique word in the structured corpus of documents with a unique word tag.

* * * * *